United States Patent
Kislov et al.

(10) Patent No.: US 10,151,008 B2
(45) Date of Patent: Dec. 11, 2018

(54) LOCALIZED HARDENING OF METALLIC SURFACES

(71) Applicant: LONGEVITY ENGINEERING SA, Luxembourg (LU)

(72) Inventors: Valentin Kislov, Kaluga (RU); Stanislav Kislov, Kaluga (RU)

(73) Assignee: LONGEVITY ENGINEERING SA, Luxembourg (LU)

( * ) Notice: Subject to any disclaimer, the term of this patent is extended or adjusted under 35 U.S.C. 154(b) by 0 days.

(21) Appl. No.: 14/379,077

(22) PCT Filed: Feb. 15, 2013

(86) PCT No.: PCT/EP2013/053092
§ 371 (c)(1),
(2) Date: Aug. 15, 2014

(87) PCT Pub. No.: WO2013/121005
PCT Pub. Date: Aug. 22, 2013

(65) Prior Publication Data
US 2016/0017450 A1    Jan. 21, 2016

(30) Foreign Application Priority Data

Feb. 15, 2012   (EP) ..................................... 12155655

(51) Int. Cl.
*C21D 6/02*   (2006.01)
*B23H 1/06*   (2006.01)
(Continued)

(52) U.S. Cl.
CPC ................. *C21D 6/02* (2013.01); *B23H 1/00* (2013.01); *B23H 1/06* (2013.01); *C21D 1/06* (2013.01);
(Continued)

(58) Field of Classification Search
CPC .... B23H 1/00; B23H 1/06; B23P 9/02; C21D 1/06; C21D 1/09; C21D 1/18; C21D 1/38; C21D 6/02; C21D 7/08; C21D 9/40
See application file for complete search history.

(56) References Cited

U.S. PATENT DOCUMENTS 5,271,187 A * 12/1993 Yoneda .................... B24B 51/00
                                                             451/21
6,417,477 B1 * 7/2002 Brown ...................... B23K 9/04
                                                             219/137.62
(Continued)

FOREIGN PATENT DOCUMENTS

CN       101204816 A   *  6/2008
DE       207 734 A1       3/1984
(Continued)

OTHER PUBLICATIONS

Alfinated coating structure on HS6-5-2 (SW7M) high speed steel S. Pietrowski, T. Szymczak* Archives of Foundry Engineering vol. 10, Issue Apr. 2010, 191-198.*

(Continued)

*Primary Examiner* — Jenny R Wu
(74) *Attorney, Agent, or Firm* — Leason Ellis LLP (57) ABSTRACT

The present invention relates to a method and system for treatment of a surface of a metallic material component, the method comprising the steps: electro-spark treating the surface of the metallic component by means of an electro-spark electrode, wherein the metallic material is a basically ferritic, perlitic and/or austenitic steel and the method creates a thin layer with martensitic microstructures at the surface of the metallic material component. Serpentines and quartz can be incorporated by an additional step as well as the surface randomly structured by this.

20 Claims, 6 Drawing Sheets

(51) Int. Cl.
*C21D 1/09* (2006.01)
*C21D 7/08* (2006.01)
*C21D 1/06* (2006.01)
*C21D 1/38* (2006.01)
*B23H 1/00* (2006.01)
*C21D 1/18* (2006.01)
*C21D 9/40* (2006.01)
*B23P 9/02* (2006.01)

(52) U.S. Cl.
CPC ............... *C21D 1/09* (2013.01); *C21D 1/18* (2013.01); *C21D 1/38* (2013.01); *C21D 7/08* (2013.01); *B23P 9/02* (2013.01); *C21D 9/40* (2013.01)

(56) References Cited

U.S. PATENT DOCUMENTS

| | | | |
|---|---|---|---|
| 6,617,271 B1 * | 9/2003 | Kodash | B23B 27/148 407/119 |
| 7,304,020 B1 | 12/2007 | Tananko et al. | |
| 2005/0160602 A1 * | 7/2005 | Shibata | B23P 15/003 29/898.066 |
| 2006/0144198 A1 * | 7/2006 | Okajima | B24B 39/02 82/158 |
| 2011/0135845 A1 | 6/2011 | Goto et al. | |
| 2013/0095731 A1 * | 4/2013 | Manning | B24B 1/00 451/28 |

FOREIGN PATENT DOCUMENTS

| | | |
|---|---|---|
| DE | 197 06 833 A1 | 9/1998 |
| DE | 197 42 739 A1 | 4/1999 |
| DE | 10 2004 058 276 A1 | 6/2006 |
| DE | 10 2006 057 940 A1 | 6/2008 |
| EP | 1 505 306 A1 | 2/2005 |
| FR | 2 790 007 A1 | 8/2000 |
| JP | 2009007663 A * | 1/2009 |
| SU | 981 400 A | 12/1982 |
| UA | 51 394 C2 | 11/2002 |
| WO | 02 18673 A2 | 3/2002 |

OTHER PUBLICATIONS

Krastev et al., "About the Surface Hardening of Tool Steels by Electrical Discharge Treatment in Electrolyte," Solid State Phenomena, 159:137-140 (2010).

Didyk et al., "Increase of Mining and Smelting Equipment Life on the Way of Tribological Barrier Overcoming," Melallurgical and Mining Industry, 3(2):67-72 (2011).

* cited by examiner

LOCALIZED HARDENING OF METALLIC SURFACES

The present invention relates to a method and system for surface treatment of metallic materials. In particular, the system and method according to the present invention relate to the hardening of a metallic surface, optionally to the densification of the hardened surface and further optionally to a surface modification with minerals to generate predefined tribo-mechanical and/or tribo-corrosive properties.

BACKGROUND OF THE INVENTION

Most steels, ferritic steels and austenic steels are difficult to nitride or carburize. Thermochemical treatment, like carburization and/or nitriding, affects the dimensional stability of components, which require further machining, limit the choice of metallic materials as well as represent a time consuming, additional steps due to the need for heating-up the entire part/component to be treated with further heat treatment.

It is well known in the art that laser can be used as a controlled heat source for hardening the surface of a metallic component. When laser is traversed onto a steel surface, a very thin superficial surface layer heats up very fast to the thermodynamic stability region of austenite and then quenches down (rapid cooling or autoquenching) due to the caloric mass of the material volume of the metallic component, which results in the formation of martensite. This martensite is untempered and tends to a very fine to amorphous microstructure.

Another prior art technique which uses a laser heat source represents "laser nitriding" which was, inter alia developed in the nineties for a local nitridation of cylinder liners in grey cast iron by using a UV-Excimer-Laser ($\lambda$=308 nm). This prior art process and the resulting surface layer produced on cast irons are disclosed, for example, in the patent applications DE 197 06 833 A1, DE 197 42 739 A1 and DE 10 2006 057 940 A1. For instance, after repeated treatment of this laser nitriding process, approximately 16-18 wt.-% of nitrogen are diluted in the grey cast iron surface in a depth of up to 2 μm. Laser treatments act very locally on the surface of the metallic material to be treated. However, laser treatment requires significant investments in the laser source.

Another known prior art technique for hardening of surfaces is the inductive hardening. In this technique, the whole surface of ferromagnetic steels is heated by a magnetic field. The steel hardnesses increase to approximately 850-1000 HV (Vickers Pyramid Number HV) by amorphisation and/or nanosizing. This technology is frequently applied to gears. The penetration depth can be reduced by applying a dual frequency magnetic field at high frequencies, as disclosed by FR 2 790 007, using very high powers for a short time. The generation of a magnetic field, however, only allows the treatment of specific geometries. Moreover, electro-magnetic hardening requires large investments in high-frequency, high power magnetic field generators.

Further, electrical discharge surface treatment is known from US 2011/0135845 wherein a coating on a treated metal is intentionally created by melting an electrode material by the energy of a pulsed electrical discharge (surface alloying technique).

It is an object of the present invention to overcome or ameliorate the obstacles of the prior art methods. In particular, it is an object to provide a method and device which allows for preferably easy and reliable surface treatment of a workpiece, preferably locally applied on tribologically stressed surfaces of metallic materials.

It is a further object of the invention to provide a device and method for hardening the surface of a metallic workpiece. It is a further object of the invention to provide a device and method for densification of a treated surface. It is yet a further object of the invention to provide a device and method for surface modifications with minerals to generate predefined tribo-mechanical and/or tribo-corrosive properties.

The objects of the invention are accomplished by the independent claims. Further preferred embodiments are defined by the dependent claims.

SUMMARY OF THE INVENTION

The present invention particularly relates to a surface treatment locally applied on tribologically stressed surfaces of metallic materials, preferably ferritic and austenitic steels, which increases the hardness and/or wear resistance without compromising in dimensional stability. In contrast to the known prior art "hot treatment" methods, the method of the present invention may be characterized as a macroscopically "cold treatment" which preferably generates locally a thin layer with a martensitic microstructure.

Furthermore, the present invention also relates to an additional or alternative method for densification of treated surfaces.

The process of the present invention preferably transforms the structure of the subsurface region from a pre-existing metallurgical structure into a new structure. In other words, it is preferred that the process does not generate a coating by additionally depositing external material on the surface but merely modifies the structure of the preexisting material at a thin surface layer. Preferably, the surface modifications realized by the present process do preferably not create porosities in the treated surface in contrast to coating techniques, like thermal spraying.

In other words, the method of the present invention forms a thin layer with martensitic microstructures at the surface of the workpiece. Still in other words, the method of the present invention re-forms or transforms a thin surface layer of the (original) workpiece into a surface layer with martensitic microstructures at the surface of the workpiece. It is therefore preferred to avoid depositing additional material on the present surface structure of the workpiece. As mentioned above, the surface treatment is done very locally in contrast to known methods which achieve, for example, treatment of a larger surface when the workpiece is submerged in an electrolyte. For instance, locally in the sense of the present invention means that a measurable chance of condition in the treated workpiece location is only within a range of a few μm around the electro-spark treating electrode. In other words, the workpiece is only treated directly under the electro-spark treating electrode in a range with a diameter between 1 μm and 10 mm, further preferred between 10 μm and 10 mm, further preferred between 100 μm and 10 mm, further preferred between 1 mm and 10 mm, further preferred between 1 μm and 1 mm; further preferred between 1 μm and 100 μm and further preferred between 1 μm and 10 μm and further preferred between 0.1 μm and 10 μm.

According to a particular embodiment it is therefore preferred that the workpiece is not submerged in an electrolyte to achieve the local treatment. In other words, according to the present invention no electrolyte should be present between the electrode and the workpiece during electro-spark treatment.

According to a further preferred embodiment, the electro-spark treatment of the surface transforms the thin layer at the surface of the workpiece into martensitic microstructures, wherein additional material from the electro-spark electrode may be deposited at the surface of the workpiece. Moreover, the present invention also relates to an additional or alternative method for doping minerals into the surface of a workpiece by a defined and controlled way which preferably generates a micro-structure of a randomly or substantially randomly distributed pattern.

According to the first aspect, the method of the present invention may comprise two main method steps: (i) electro-spark treatment of the surface of the metallic component and (ii) doping of the previously treated surfaces with mineral particles.

According to a further aspect, the method of the present invention may comprise three main method steps: (i) electro-spark treatment of the surface of the metallic component; (ii) densification of the treated surface optionally; and (iii) doping of the previously treated surfaces with mineral particles.

It is explicitly pointed out that each of the above mentioned steps may be performed alone/separately without the need to perform other steps before or afterwards. The three preferred individual steps (in the following also abbreviated as steps 1-3) are discussed below in more detail.

Electro-Spark Treatment/Step 1

The electro-spark treatment according to the present invention uses an electrical discharge device. Sparks generated from the electrical discharge device on the surface of the metallic material to be treated induce a strong heat flow into the surface of the metallic material. The electrical discharge device (also called "spark electrode" or just "electrode" in the following) is preferably designed as a "moving heat source". In other words, it is preferred that the metallic material component to be treated (also abbreviated as "workpiece") may perform a movement relative to the spark electrode or vice versa. Preferably, due to the spark treatment, the localized area of the surface of the workpiece heats up to temperatures in the thermodynamic stability region of austenite and is preferably instantly quenches down due to the caloric mass of the material volume. The combination of the electrical discharge device and the relative movement preferably provides the advantage that a very local treatment is possible, i.e., the workpiece is preferably only treated where the spark of the electrical discharge device is generated. This local treatment is preferably achieved by omitting electrolytes between the electrical discharge device and the workpiece since such an electrolyte would lead to a "global treatment" of the surface of the workpiece.

The system or device according to the present invention for surface treatment of the metallic material/workpiece comprises at least one electrode (spark electrode). The electrode may be provided and/or controlled by a current supply device. Preferably, the electrode is fed with an alternating voltage (AC), preferably between 110V through 220/240V to 380V. One of the preferred frequencies is 50 Hz, but not limited to this frequency. The power consumption of the supply unit fed to the electrode is preferably between 0.25 kW and 3 kW.

The electrode is preferably made from a wear-resistant alloy, like cemented carbide tools of WC—Co type, such as BK8 (ISO K30/40), T5K10 (ISO P30), BK10OM (ISO M30), or of steels, like 95X18 (GOST 5632 equivalent to X105CrMo17, 1.4125), etc., and is not limited to these. Suited for the electrode are also carbon tool steels, high-speed tool steels or alloy tool steels as well as electrically conductive hard metals bonded by nickel, nickel/chromium or nickel/molybdenum alloys. As mentioned above, surface treatment with a spark electrode preferably only modifies or transforms the original material at the surface of the workpiece and preferably no material from the electrode will be transmitted to the surface of the workpiece.

According to a preferred embodiment, the electrode is cylindrical, preferably with a round or substantially round cross-section. The diameter of the (cylindrical) electrode is preferably 1 mm to 10 mm. The cylindrical electrode may comprise a tip which is not limited to a particular shape. For instance, the tip may be flat or pointed. Preferably, the tip comprises a canonical shape.

According to the present invention, a plurality of metallic materials with different surface properties may be treated. Preferably, the initial surface roughness of the metallic material prior to treatment is Ra (C.L.A.)=0.01 to 1.6 µm, more preferably between Ra of 0.1 to 1.6 µm, wherein Ra is defined as the arithmetical mean deviation of the assessed profile and the inch equivalent parameter is C.L.A. (centre line average).

It is preferred that there is a relative movement between the part to be treated (workpiece) and the electrode during treatment. In other words, the part to be treated and/or the electrode perform relative movement(s) during treatment. Preferably, the part to be treated rotates. Preferably, the surface of the part to be treated rotates with a rotational speed of 0.1 m/min to 1 m/min. Alternatively or additionally, the electrode may slide, roll or slip-roll over the surface area to be treated.

Moreover, it is further preferred that the electrode, preferably the cylindrical electrode, performs a rotation along his own (longitudinal) axis. Preferably the cylindrical electrode rotates with a rotational speed of 10 rpm to 1500 rpm. The rotational movement may be continuous or may be stepped.

Furthermore, it is preferred that a particular area of the surface to be treated is treated at least once, preferably more than once. For instance, a number of double strokes (back and forth movements) of the material or repeated treatments up to 10 times are preferred. According to further preferred embodiments, up to 100 repeats may assure the desired surfaces transformations and/or depths. The later depends from the hardenability of the alloy. However, for a plurality of predetermined properties and most common alloys it is already sufficient if the workpiece is only treated once.

The voltage passing the electrode is preferably between 20-50 Volts during the first pass/first treatment. In case multiple passes/treatments should be performed, it is preferred that the voltage is >40 Volts for subsequent repeats.

In order to generate simultaneously dimples/cavities/indents, the tip point of the electrode may be additionally actuated along its (longitudinal) axis and preferably indents more or less perpendicular to the surface. This actuation (longitudinal or axial movement) may be achieved by electromagnetic actuators, pneumatic, piezoelectric actuators or stroke-yoke systems. The axial actuation of the electrode or the tip of the electrode may be performed with the following parameters: The actuation frequency is preferably between 40 Hz to 50 000 Hz. Preferably, the frequency is between 50 Hz and 1000 Hz. However, according to the present invention ultrasonic actuation of the electrode is also possible, i.e., actuation with a frequency >20 000 Hz. The axial (vibrational) amplitude is preferably in the range between 0.005 to 0.5 mm. The axially indenting load is preferably in the range from 10 g to 3000 g (0.1 N to 30 N).

Densification/Step 2

The electro-spark treatment as well as the doping (see step 3 below) lead to a transformation of the surface. An additional optional densification step (also labeled "step 2" in the present application) intends to smoothen the treated and/or doped surface areas. This additional densification step 2 may be applied subsequent to the above discussed electro-spark treatment (step 1) and/or the mineral coating (step 3). It is, however, preferred to apply this step 2 after steps 1 and preferably before step 3.

For instance, machine hammer peening is a relatively new method for finishing surfaces. The workpiece surface is modified through repeated impact by a spherical carbide tool through oscillating movement. Such a method increases the hardness or residual stresses due to hammer peening. Machine hammer peening intends to plastically transform a thin surface layer (100-500 nm) by cold working hardening, which increases the compressive residual stresses in the sub-surfacial layers, and not by rapid heating like the electro-spark hardening. According to the present invention, however, it is preferred to avoid hammer peening.

According to the present invention, it is preferred to densify the surface subsequent to the electro-spark treatment, preferably by other methods. In particular, a surface densification according to the present invention may be achieved by rolling or press rolling.

Preferably a (metallic) tool for applying pressure to the workpiece is used for this treatment. For instance, a metallic sphere or roll, preferably made from a hard material is preferred. The hardness of the tool is preferably >60 HRC. By means of said tool a contact pressure is applied to the surface of the workpiece, e.g., by rolling, sliding or otherwise. According to a preferred embodiment, the workpiece is rotated during this treatment, preferably a rotational speed of the surface to be treated is between 3 m/min to 300 m/min.

According to a further preferred embodiment, the tool is supplied until it gets in contact with the surface to be treated. Afterwards the tool is moved along the rotation axis of the workpiece with a traveling speed over the surface of the workpiece between 0.01 to 10 mm per rotation and with contact pressure of 0.5 kg/mm$^2$ to 100 kg/mm$^2$. The number of double strokes (back and forth) is up to 10. Densification of surface coating is preferably performed for the entire length that requires treatment.

Mineral Treatment/Step 3

As mentioned above, the method of the present invention may be divided into two method steps, namely, the electro-spark treatment of the surface of the metallic component and, optionally (additionally or alternatively), the doping of the previously treated surfaces with mineral particles. According to a preferred embodiment of the present invention, step 2 is an optional step between steps 1 and 3.

According to the present invention, tribological surfaces may be doped with nanosized or sub-micron particles of various minerals. The particles/particulates are preferably dispersed homogeneously in a fluid, preferably in a liquid such as oil, glycerin, polyglykol or water. In other words, the particles are preferably provided in a suspension. The fluid is preferably the carrier fluid for the particulates to be doped in order to apply these evenly distributed. This suspension is preferably only used during the treatment for doping and preferably not as lubricating oil like in an oil circuit with pump. The surface area to be treated is preferably immersed in the suspension or wetted by the suspension.

Preferably, an indenter tool (in the following also abbreviated as "indenter") is used for indenting the minerals on and/or into the surface of the surface area to be treated. Moreover, the indenter is used to fill pores or irregularities in the surface of the material to be treated. Accordingly, the surface roughness decreases; the surface becomes smoother.

The mechanisms of the indents/minerals are: (i) cold work hardening around the indents by plastic deformation and (ii) enhancement of early fluid film formation by the micro-cavities.

It is known that micro-cavities with various shapes, diameters and depths may enhance the hydrodynamic film formation during start/stop. This effect is predominant during start-stop of e.g. journal bearings and reduces the wear, because the length of mixed and/or boundary lubrication is significantly shortened. Furthermore, the micro-cavities store lubricant and enhance emergency running properties, when the lubrication supply is shortened or interrupted. The technologies used today for creation of micro-cavities in seals and bearings intend to generate arrays of uniformly distributed or harmonic patterns. For instance, laser surface texturing (LST) is a widely used technology that allows improving the surface micro-topography and -structure of tribologically stressed surfaces, but also punching/stamping of patterns is known. These techniques for artificial or synthetical texturing aim to generate a regular structure of iso-shape in any form and iso-spacing. In contrast, the doping method according to the present invention preferably creates a randomly distributed pattern of irregular shaped cavities/dimples/indents by applying a simple process.

Furthermore, according to the present invention it is preferred to use serpentines as solid and mineral additives for the doping process.

The dispersion of nanosized particulates, like soot, $CaCO_3$ or $MoS_2$ and graphite ("LiquiMoly" or "Molygraphite" von ELF ANTAR) in engine oils is known. There are also some new minerals that are called "geoadditives". For instance, silicate-based blending/additive materials for lubricants can be found in literature and patent applications. The commercially available lubricant "FORSAN™" contains 5% by volume of silicate-based particulates (www.forsan.info). Moreover, the applications WO 02/18673, DE 10 2004 058 276 and U.S. Pat. No. 7,304,020 apply a wide range of minerals dispersed in the lubricating oil. The common mechanism of this prior art lubricants is the following. During tribological operation of the lubricant containing these minerals, a transfer layer is generated on the rubbing surfaces by the particulates dispersed in the lubricants. This mechanism can also be applied for restoring/reconditioning of worn out surfaces. The Chinese authored publication [Tribology International 37 (2004) 561-567] validated particulates of $Mg_6(Si_4O_{10})(OH)_8$ dispersed in a SAE 40 (API SD/CC) engine oil operated in locomotive engines (16V280, 3600 kW), which had already accumulated 150000 km. On the liner surfaces are formed by transfer film formation a layer of 8-10 μm of thickness having a micro-hardness of ~780 HV. The disadvantage for such engine oils is the fact, that all silicate-based particulates form ash, which blocks the soot particulate filters and deactivates the active centers of the catalytic converter. All ACEA C1 to C4 engine oil specifications require low ash formulations (lower than 0.5% by weight), which are far below the necessary treat rate of the suspensions used in this Chinese publication. Lubricating engine oils containing "geo-additives", silicate-based particulates, are unsuitable worldwide for all engine types (passenger cars and trucks) that have ash built-up exhaust after treatment devices.

According to the present invention, it is preferred to use serpentine for the mineral doping. In particular, within the group of such silicates the subgroup of phyllosilicates is found containing serpentines among other groups according to chemistry. Serpentine is a double layered silicate. The generic formula for serpentine $Mg_3Si_2O_5(OH)_4$ in a double (or bimolar) expression is:

where X stands for different ions, like $Mg^{2+}$, $Fe^{2+}$, $Ni^{2+}$, $Mn^{2+}$, $Mn^{3+}$, $Cr^{3+}$ or $Cu^{2+}$ located in octahedral lattice positions and Y for ions, like $Si^{4+}$, $Al^{3+}$ and $Fe^{3+}$ an tetrahedral lattice position, and for magnesium-type Serpentines, like Lizardite, Antigorite and Chrysotile:

where $M^{2+}$=Mg, Fe, Mn and Ni as well as $M^{3+}$=Al, Fe and Cr.

Figure 3:
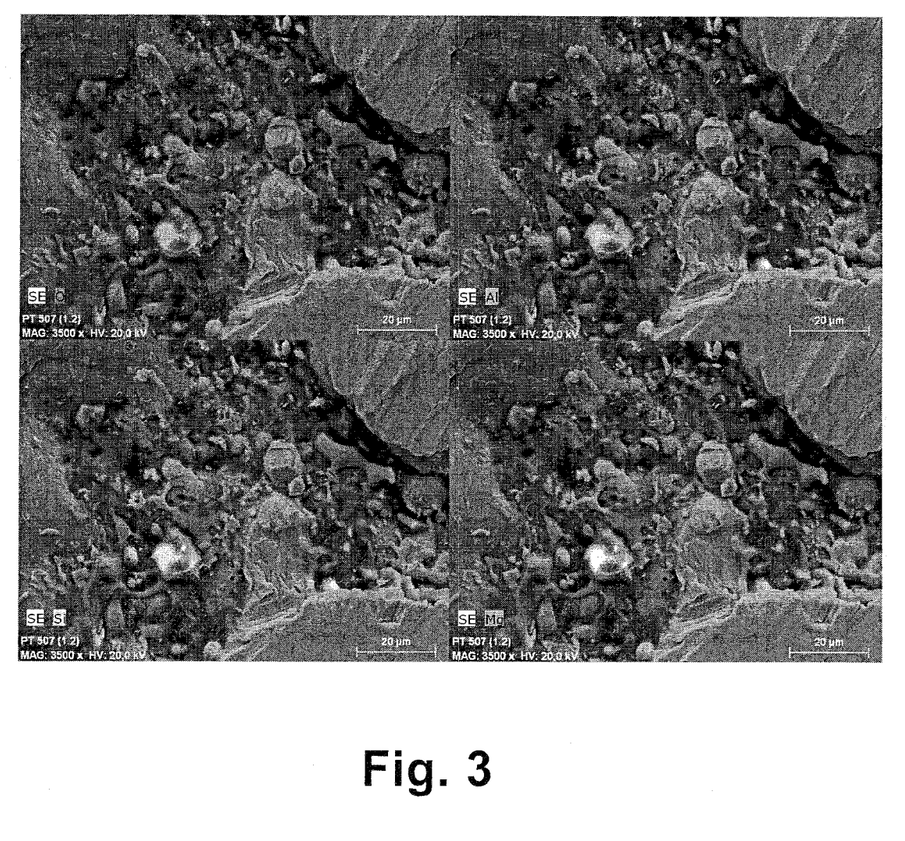
FIG. 3 shows a SEM micrograph as enlargement of a cavity/dimple containing Serpentine

The serpentine powder as preferably used according to the present invention can be of natural- or synthetic origin. Serpentine powders derived from natural/mineral resources may contain up to 10% by weight of other components, like corundum or silicates, which occur naturally and were not blended intentionally. FIG. 3 illuminates cavities filled with serpentines composed of silicon, magnesium and oxygen.

The concentration of serpentine particulates in the dispersion is preferably between 1% and 20%. Furthermore, the suited size of the particles is preferably in the range from 1 µm to 50 µm.

Further preferred minerals are, for example, "optical quartz", $SiO_2$+Fe, burned serpentine, preferably burned at 950° C., calcined, $Mg_6[Si_4O_{10}](OH)_8$, Eudialyt, $Na_{12}Ca_6Zr_3[Si_3O_9][Si_9O_{24}(OH)_3]_2$, baddeleyite, monoclinic $ZrO_2$, fused zirconia, crushed, sieved and/or milled to micrometer or nanometer size. Zirconia may be further stabilized by MgO or CaO or $Y_2O_3$.

Additional preferred materials are titanomagnetites (empirical formula: $Fe(Fe_{0.75}Ti_{0.25})_2O_4$ or chemical formula $Fe^{2+}(Fe^{3+},Ti)_2O_4$). In particular, a titanomagnetite is a complex oxide class mineral, an intermediate member of isomorphous series of solid solutions of magnetite ($FeFe_2O_4$), ulvospinel ($Fe_2TiO_4$), and magnesian ulvospinel ($Mg_2TiO_4$). Titanomagnetite is also the name for magnetite with inclusions of solid solutions decay products (ulvospinel, ilmenite) and further substitution products of such decay products (rutile, brookite, pcrovskite, etc.). In nature, magnetites with high ilmenite component content (up to 37%) preserving cubic structure in the presence of vacancies in tetrahedral and octahedral sublattices, called titanomaghemites, are very common. The crystal structure is of inverted spinel type. Unit cell parameter increases in magnetite-ulvospinel series from 8.39 to 8.53. Titanomagnetite contains admixtures of $Al^{3+}$, $V^{4+}$, $Gr^{3+}$, $Mn^{2+}$, etc. It occurs as octahedral crystals and, more frequently, granular aggregates and black masses. Mohs hardness, 5.0-5.5; density, 4,800-5,300 kg/m3. Titanomagnetites are strongly pronounced ferrimagnetics, although ulvospinel itself is paramagnetic. Two ranges of Curie points characteristic of titanomagnetite are 0-100° C. (for ulvospinel with $FeFe_2O_4$ content of up to 20%) and 500-570° C. (for magnetite with $Fe_2TiO_4$ content of up to 10%). Partial decomposition of a solid Titanomagnetite solution causes self-reversal of thermoremanent magnetization, a phenomenon used in paleomagnetic studies.

According most of the present embodiments, the chemical nature of the base oil for the dispersing the particulates is substantially irrelevant. Preferably, the viscosity of the dispersant fluid is in the range between "water" (|40° C.=1 mPas) and literally "butter" (|40° C.=10000 mPas).

For reducing friction, it is preferred to use serpentine, preferably serpentine as a component or sole component. For enhancing corrosion resistance and/or wear reducing properties it is preferred to use quartz, preferably as a component or sole component. Furthermore, for reducing friction, enhancing corrosion resistance and reducing wear, it is preferred to use serpentine and quartz in combination, preferably in a 50:50 ratio.

In order to generate dimples/cavities/indents, the tip point of the electrode can be additionally actuated along its axis and indents more or less perpendicular to the surface. This axial actuation can be achieved by electromagnetic actuators, piezoelectric actuators or stroke-yoke systems. The axial actuation may be characterized, for example by at least one of the following parameters:

Frequency: 40 Hz to 50 000 Hz.
Axial amplitude: 0.005 to 0.5 mm
Axial indenting load: 50 g to 3000 g.

The intender is preferably formed from a hard material. In particular, the term "indenter" refers to an instrument such as the instrument N1 (roll) or instrument N2 (metallic sphere) or instrument N3 (working tool of the ultrasonic device) as discussed in the detailed description below. Preferred materials for the intender are hard alloys based on tungsten carbide or titanium carbide bonded with nickel, nickel/molybdenum or cobalt; either natural or synthetic diamond or polycrystalline diamond (PKD). Hard metals may also be composed of mixtures of hard phases, like WC, Cr2C3, TiC, TaC and/or NbC.

According to a preferred embodiment shown in the figures, the serpentine powder comprises at least one of the following components, preferably all of the following components: antigorite, lizardite and talc. According to preferred embodiment the serpentine power is composed by approximately ~45 wt.-% of Antigorite, ~45 wt.-% Lizardite and ~10 wt.-% Talc. These composition of the serpentine powder can vary in phase compositions.

Micrographs have been taken from an example treated with the above defined serpentine powder. The micrographs taken by means of scanning electron microscopy (SEM) showed a flaky-like morphology in the sub-micron range. The overlay of elements mapping to the SEM picture confirmed, that the serpentine power used is composed of magnesium, silicon and oxygen. Some contaminations with aluminium and calcium are of natural matter from the mineral ore used as well as the iron contamination results from the milling process.

Figure 7:
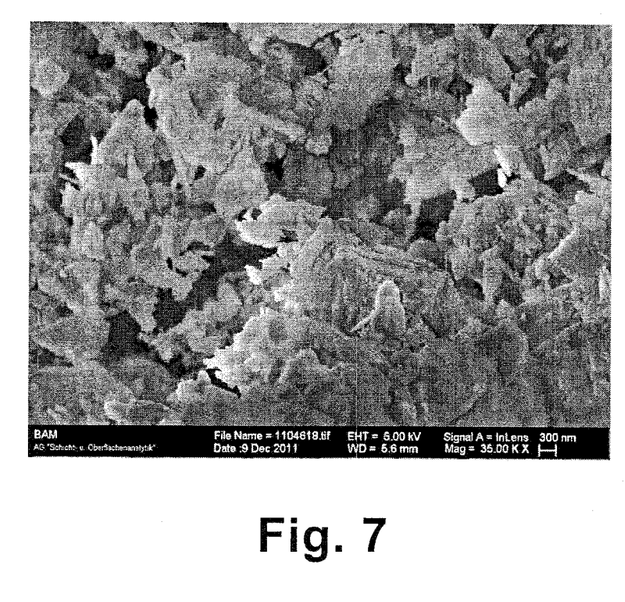
FIG. 7 SEM micrograph of the serpentine powder used for the disclosed embodiments.

FIG. 7 displays a typical pattern/morphology for ball milled powders

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
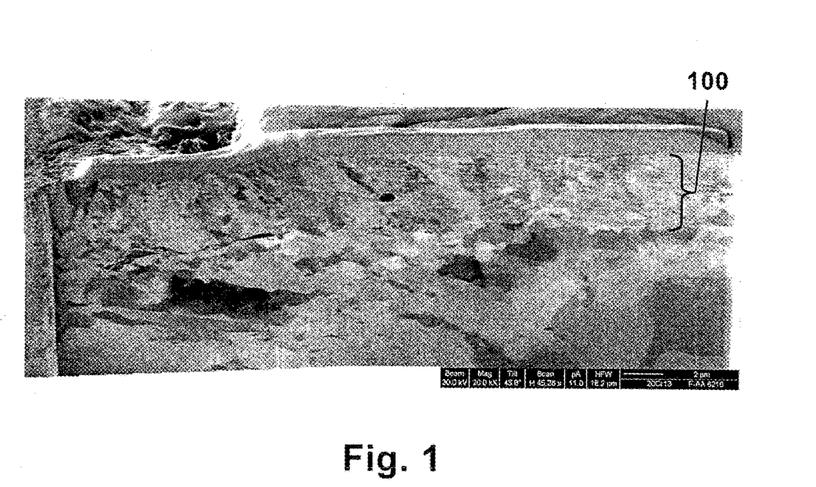
FIG. 1 shows schematically a cross section of a treated X12Cr13 surface by means of focussed ion beam (FIB) cutting.
Figure 2:
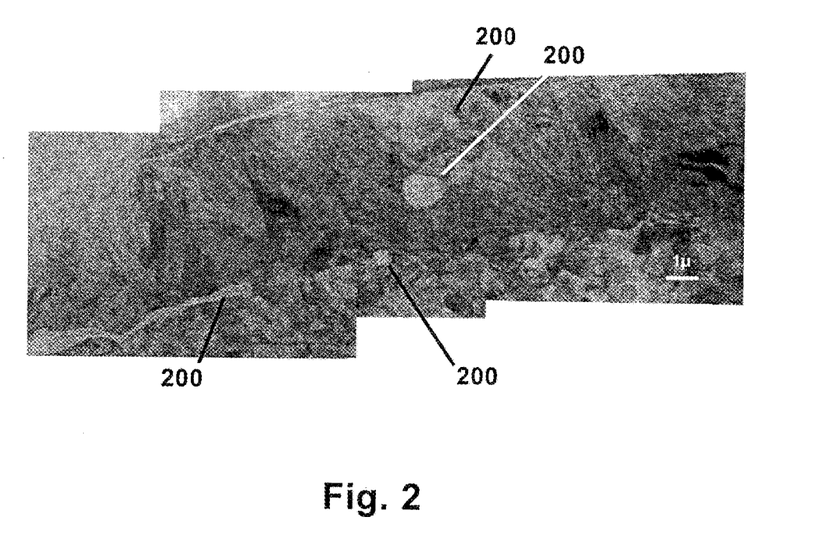
FIG. 2 shows schematically an enlargement of the cross section of the treated X12Cr13 surface shown in FIG. 1 by means of transmission electron microscopy (TEM)

A X12Cr13 (~20Cr13) steel was electro-spark treated in accordance with the present invention (sample PT501) and the cross sections are shown in the FIG. 1 and FIG. 2.

As shown in FIG. 1 and depending on the operating parameters, a more or less deep transformation zone 100 is created. The transformation zone in FIG. 1 is approximately 4 μm.

In contrast to hardening by laser, the microstructure is micro- or nano-crystalline with an average grain size smaller than the untreated material below. The affected zone or penetration depth in FIG. 1 is ~3-4 μm and shows martensite with inclusion of $FeCr_2O_4$. The grain sizes of the transformed layer were refined, but still remained crystalline. The formation of $FeCr_2O_4$ indicates locally high temperatures during the treatment, even for short periods. The ferritic X12Cr13 (1.4006; 12X13-III in Russian, closely to X20Cr13) substrate treated in FIG. 1 showed M23C6 carbides on the grain boundaries.

The FIG. 2 highlights the oxidic inclusions of $FeCr_2O_4$, which are marked by reference sign 200. The formed martensite is a lath martensite with twinnings. FIG. 2 clearly shows that the electro-spark treatment has not created an amorphous microstructure. The average universal hardness and the average plastic hardness determined by nanoindentation (using Fischerscope H100) of the untreated X12Cr13 surface were:

Universal hardness: 2260 MPa±70 MPa and
Plastic hardness: 2530 MPa±80 MPa.

The treatment shown in FIG. 1 resulted in an increase of hardness, which is coherent with the findings in FIG. 1:

Universal hardness: 4300 MPa±700 MPa and
Plastic hardness: 6300 MPa±1000 MPa.

The treatment according to the present invention may be repeated in order to achieve the desired depth of affected zone. Two passes are preferred in order to avoid annealing of the martensite. Depending on the metallurgy and annealing temperature of the metal/steel in question, repeated treatments may apply.

As a consequence from the localized treatment according to the present invention, the part as a whole will not be heated. This assures, inter alia, the dimensional stability of the part during and after treatment as well as allows to avoid further machining and finishing operations. In consequence, it is preferred that only the tribologically stressed sections of a part/component will be treated. This widens the freedom in selecting of metallic materials for tribological applications, because no thermochemical treatments, like nitriding or carburizing, are necessary.

Figure 4:
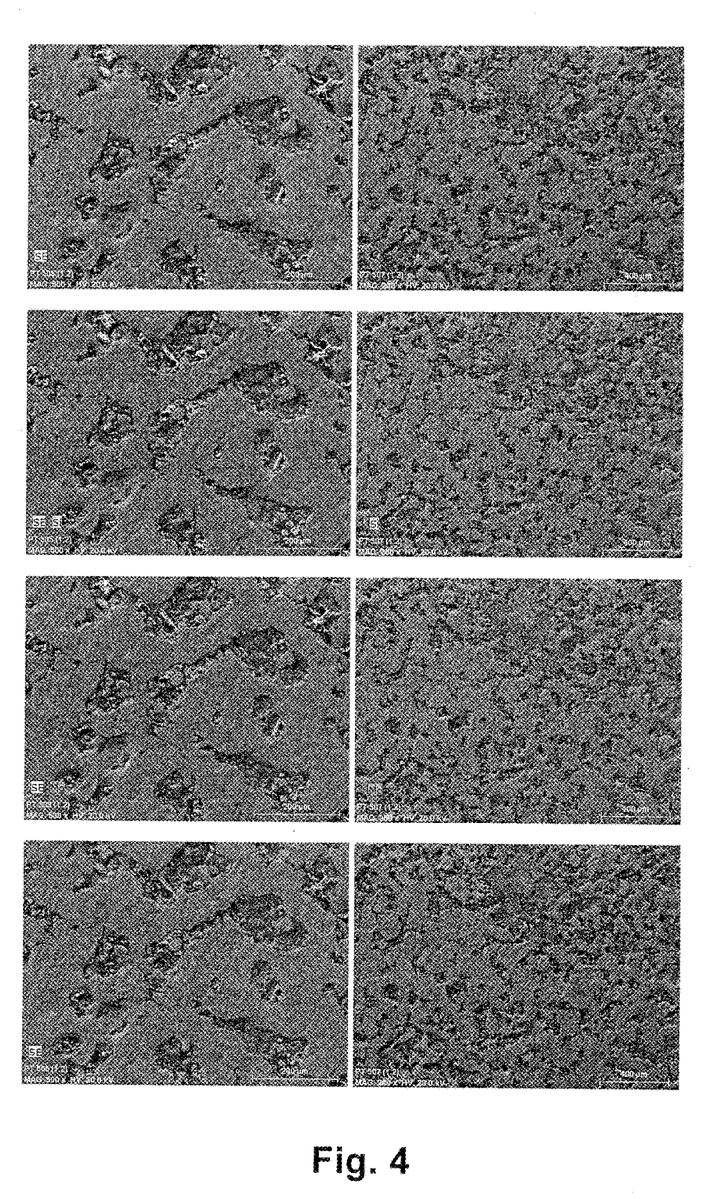
FIG. 4 shows SEM micrographs of sample PT507 (electro-spark treatment) with mapping of the elements silicon, magnesium and oxygen [left column: magnification of 1000×; right column: magnification of 500×)]

FIG. 4 illustrates the results of a treatment according to an electro-spark treatment. The scanning electron microscope (SEM) pictures were taken using a SEM Supra 40 from ZEISS equipped with an EDX-Detector "X-Flash" from BRUKER and the software "Quantax 4000". The pictures in the left column are taken at a magnification of 1000× (×=times). The corresponding pictures in the right column are taken at a magnification of 5000×.

The (SEM) picture in the top row ($1^{st}$ row) show the network of cavities, indents or dimples. In the SEM pictures in the $2^{st}$ to $4^{th}$ row show one element mapping overlayed to the SEM pictures of the top row. The elements were silicon (Si; $2^{nd}$ row), magnesium (Mg; $3^{rd}$ row) and oxygen (O; $4^{th}$ row), because Serpentines are composed by these elements and not the X12Cr13 steel. All three predominant elements of Serpentines are in the cavities, proving that the X12Cr13 surfaces were doped with serpentines by the indenter.

The FIG. 4 also shows that nearly all the cavities were filled with Serpentine.

Details for preparing the example "1.2-10 Ш T 1.2 PT501", shown in FIG. 4 are summarized in the following Table 1, $3^{rd}$ column. Preferred parameter ranges are summarized in the $2^{nd}$ column of Table 1.

TABLE 1

|  | Preferred range of operating conditions according to the present invention | PT501 (1.2) 1.2-10 ШТ |
|---|---|---|
| Material of part | Metals and alloys | X12Cr13 (1.4006; 12X13-III) |
| Step 1 (electrospark hardening) | | |
| Initial surface roughness | Ra = 3.2 μm to Ra = 0.1 μm | Ra = 1.6 μm to Ra = 2.2 μm |
| Electrode material | VK8, T5K10, VK10OM, or steels 95X18 | VK8 |
| Shape of electrode tip | not relevant | Flat ended rod |
| Electrode diameter | 1 mm to 10 mm | 3 mm |
| Auto-rotational speed of electrode | 10 rpm to 1500 rpm | 800 rpm |
| Travelling speed over surface of part, mm/rotation | 0.01-2 | 0.8 |
| Axial load on electrode | 50 gr. to 3000 gr. | 200 gr. |
| Electrode axial vibration frequency | 100 Hz to 50 000 Hz | 400 Hz |
| Electrode axial vibration amplitude | 0.01 mm to 0.5 mm | 0.20 mm |
| Voltage amplitude fed to electrode, [V] | first run: 20-40 V subsequent runs: >40 V | first run 30 V, subsequent runs 50 V |
| Voltage in mains | 220 V | 220 V |
| Frequency of voltage | 50 Hz | 50 Hz |

TABLE 1-continued

|  | Preferred range of operating conditions according to the present invention | PT501 (1.2) 1.2-10 ИПТ |
|---|---|---|
| Step 2 (densification) | | |
| Material type of tool | N1 or N2, or N3 | steel 40X nitrided |
| Geometry of tool | — | roller |
| Rotational speed of part | 3 m/min to 300 m/min | 30 m/min |
| Traverse speed of tool, mm per rotation | 0.01 mm to 10 mm | 0.2 mm per rotation |
| Load on tool | 0.5 kg/mm$^2$ to 100 kg/mm$^2$ | 20 kg/mm$^2$ |
| Suspension (type of mineral, particle size, concentration) | | |
| Number of double strokes | up to 10 | 2 |
| Step 3 (mineral doping) | | |
| Material type of tool | N1 or N2, or N3 | steel 40X nitrided |
| Geometry of tool | | roll |
| Rotational speed of part | 3 m/min to 300 m/min | 30 m/min |
| Traverse speed of tool, mm per rotation | 0.01 to 10 mm per rotation | 0.2 mm per rotation |
| Load on tool | 5 kg to 100 kg | 20 kg/mm$^2$ |
| Number of double strokes | up to 10 | 1 |

Figure 5:
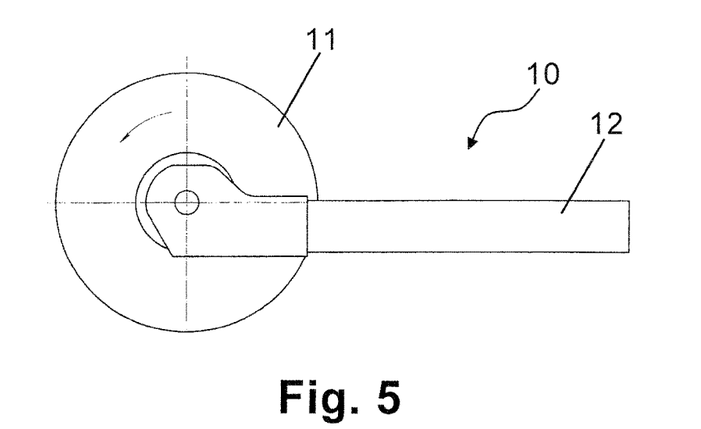
FIG. 5 shows a roll as used as instrument N1.

FIG. 5 shows an example of a tool N1 (see ref. Sign 10). The roller 10 preferably comprises a shaft or mandrel 12 for mounting the tool to an appropriate mounting structure such that tool 10 can be forced against the workpiece to be treated. It is preferred that at least the roll 11 of tool 10 is made from a hard alloy, e.g., based on tungsten carbide or titanium carbide bonded with nickel, nickel/molybdenum or cobalt. The roller 10 can be used for the densification step (pressing step 2). In particular, according to the present invention it is preferred to use the shown roller as an instrument N1.

Figure 6:
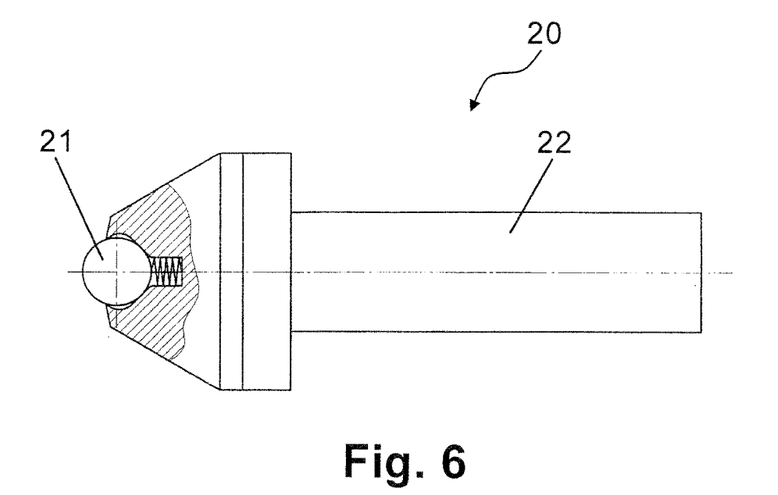
FIG. 6 shows an example for instrument N2 with a metallic sphere.

FIG. 6 shows a further example of an instrument 20 for the densification step with a spherical tip 21 that may rotate (also labeled tool N2). The tool 20 preferably comprises a shaft or mandrel 22 for mounting the tool to an appropriate mounting structure such that tool 20 can be forced against the workpiece to be treated. It is further preferred that at least the spherical ball/tip 21 of tool 20 is made from a hard alloy, e.g., based on tungsten carbide or titanium carbide bonded with nickel, nickel/molybdenum or cobalt.

Figure 8:
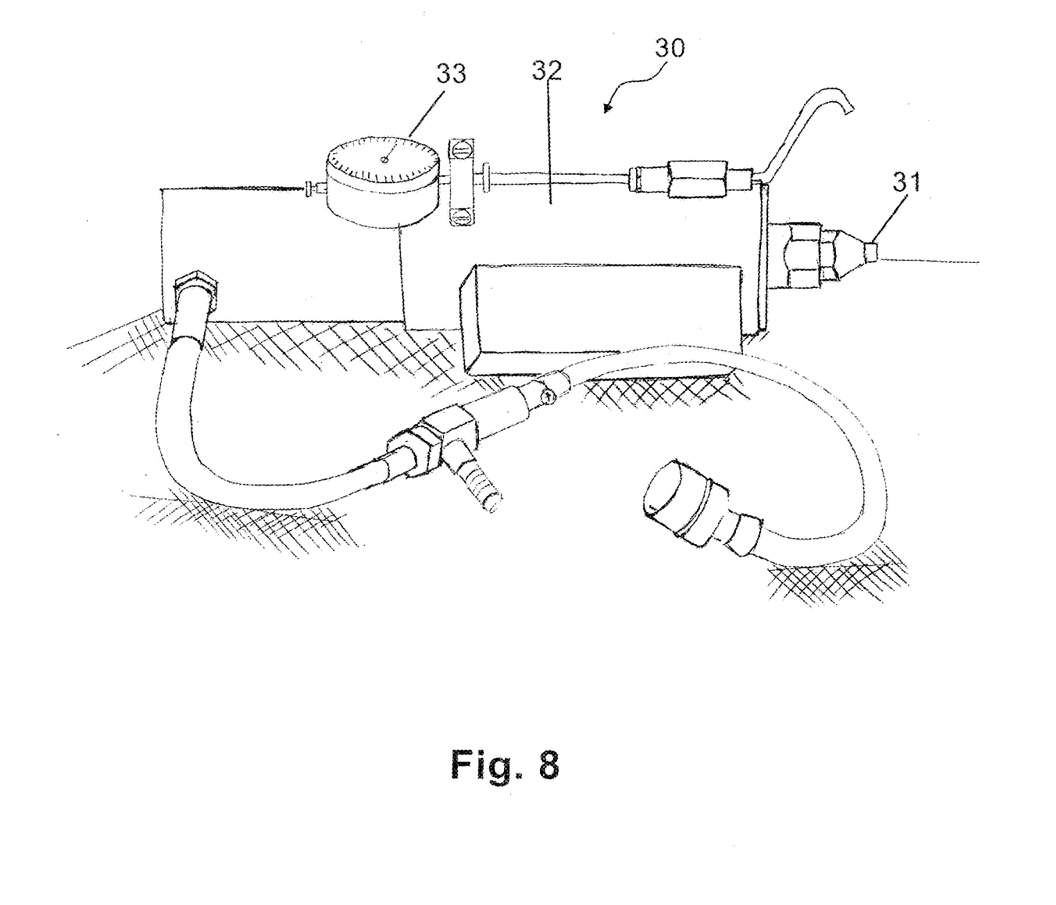
FIG. 8 shows an example of an instrument N3.

FIG. 8 shows a further example of an instrument 30, which may be used as tool N3. The shown tool 30 is an ultrasonic indentor with the indentor 1 an ultrasonic device 20 which can be used to generate dimples/cavities/indents at the surface of the workpiece. In particular, the shown ultrasonic indentor allows that the tip point 1 can be actuated the along the longitudinal axis of the tool 30. This actuation (longitudinal or axial movement) can be achieved by a pneumatic mechanism. The axial actuation of the tip 1 may be performed with the following parameters. The actuation frequency is preferably between 40 Hz to 50 000 Hz. Preferably, the frequency is between 50 Hz and 1000 Hz. However, according to the present invention ultrasonic actuation of the electrode is also possible, i.e., actuation with a frequency >20 000 Hz. The axial (vibrational) amplitude is preferably in the range between 0.005 to 0.5 mm. The axially indenting load is preferably in the range from 10 g to 3000 g (0.1 N to 30 N).

While the invention has been described with reference to the exemplary embodiments thereof, those skilled in the art will be able to make various modifications to the described embodiments without departing from the true scope of the invention. The terms and descriptions used herein are set forth by way of illustration only and are not meant as limitations. In particular, although the methods and devices has been described by examples, the steps of the method may be performed in a different order than illustrated or simultaneously. Those skilled in the art will recognize that these and other variations are possible within the scope as defined in the claims and their equivalents.

The invention claimed is:

1. A method for treating a surface of a metallic workpiece for transforming a thin layer at the surface of the workpiece into martensitic microstructures, the method comprising the steps of:
   electro-spark treating the surface of the workpiece by means of an electro-spark electrode, wherein the electrode performs a rotation around its longitudinal axis with a rotational speed between 10 rpm to 1500 rpm, and wherein no electrolyte is provided between the electro-spark electrode and the workpiece; and
   doping the electro-spark treated surface of the workpiece with mineral particles, wherein a randomly distributed pattern of cavities or dimples or indents is created on the surface of the workpiece.

2. The method according to claim 1, wherein the electro-spark electrode is made from a wear-resistant alloy.

3. The method according to claim 1, wherein the initial surface roughness Ra of the workpiece prior to treatment is 0.01 to 1.6 μm.

4. The method according to claim 1, wherein a relative movement between the workpiece and the electrode is provided during treatment.

5. The method according to claim 1, wherein a tip point of the electrode which gets in contact with the workpiece moves along its longitudinal axis back and forth during treatment.

6. The method according to claim 1, wherein electro-spark treating the surface transforms the thin layer at the surface of the workpiece into martensitic microstructures without depositing material from the electro-spark electrode at the surface.

7. The method according to claim 1, wherein subsequent to the electro-spark treatment the surface of the workpiece is densified by means of a tool selected from the group consisting of a roll, a metallic sphere and a working tool of an ultrasonic device.

8. The method according to claim 7, wherein the hardness of the tool selected from the group consisting of a roll, a metallic sphere; and a working tool of an ultrasonic device is >60 HRC.

9. The method according to claim 7, wherein the workpiece is rotated during the densifying treatment.

10. The method according to claim 1, wherein the mineral particles are provided in a suspension, and wherein the workpiece is immersed in the suspension or wetted by the suspension before or during treatment.

11. The method according to claim 1, wherein the mineral particles are indented on the surface of the workpiece by means of an indenter to fill pores or irregularities in the surface.

12. The method according to claim 1, wherein the minerals comprise at least one of the following components: serpentines and quartz.

13. The method according to claim 1, wherein the minerals comprise at least one of the group consisting of: optical quartz, $SiO_2$+Fe, burned serpentine, calcined, $Mg_6[Si_4O_{10}](OH)_8$, Eudialyt, $Na_{12}Ca6Zr_3[Si_3O_9][Si_9O_{24}(OH)_3]_2$, baddeleyite, monoclinic $ZrO_2$, zirconia, fused zirconia, crushed, sieved and/or milled to micrometer or nanometer size, zirconia further stabilized by MgO and/or CaO and/or $Y_2O_3$, titanomagnetite.

14. The method according to claim 2, wherein the wear-resistant alloy is WC—Co cemented carbide tools or steel.

15. The method according to claim 3, wherein the initial surface roughness Ra of the workpiece prior to treatment is between of 0.1 to 1.6 µm.

16. The method according to claim 4, wherein at least the workpiece is rotated during treatment.

17. The method according to claim 16, wherein the workpiece is rotated with a rotational speed of 0.1 m/min to 1 m/min.

18. The method according to claim 1, wherein a tip point of the electrode moves along its longitudinal axis back and forth with a frequency between 40 Hz to 50000 Hz.

19. The method according to claim 7, wherein the surface of the workpiece is densified by rolling or press rolling.

20. The method according to claim 9, wherein the workpiece is rotated with a rotational speed of 3 m/min to 300 m/min.

* * * * *